Jan. 20, 1970     E. BRICHARD ET AL     3,490,147
METHOD FOR OPTIMALLY CUTTING SUCCESSIVE PANELS
OF PIECES FROM A SHEET OR STRIP
Filed Dec. 7, 1967     7 Sheets-Sheet 1

| I | XF | | | YF | C | Q | R |
|---|-----|-----|----|-----|---|---|------|
| 1 | 280 | | | 100 | 1 | 1 | 2160 |
| 2 | 100 | 105 | 60 | 90  | 3 | 1 | 2140 |
| 3 | 100 | 110 |    | 95  | 2 | 2 | 2050 |
| 4 | 295 |     |    | 130 | 1 | 3 | 1970 |
| 5 | 80  | 80  | 80 | 70  | 3 | 3 | 1760 |

INVENTORS
Edgard Brichard
J.A. Valembois &
Andre Raes
BY Spencer & Kaye
ATTORNEYS United States Patent Office 3,490,147
Patented Jan. 20, 1970

3,490,147
METHOD FOR OPTIMALLY CUTTING SUCCESSIVE PANELS OF PIECES FROM A SHEET OR STRIP
Edgard Brichard, Jumet, Jean Adolphe Valembois, Woluwe Saint Lambert, and André Raes, Balen, Nette, Belgium, assignors to Glaverbel, Watermael Boitsfort, Belgium
Filed Dec. 7, 1967, Ser. No. 688,808
Claims priority, application Luxembourg, Dec. 13, 1966, 52,593
Int. Cl. G01b 3/14
U.S. Cl. 33—1
21 Claims

ABSTRACT OF THE DISCLOSURE

A method for determining the best mode of cutting the pieces listed in an order book from a sheet or strip by detecting the defects therein, establishing a table each line of which lists a piece or combination of pieces taken from the order book, the total width of the pieces of each table line not exceeding the total usable width of the sheet or strip, locating a first table line the pieces of which could be cut from a first panel at the forward end of the sheet or strip taking account of the defects present at such forward end, locating a second table line the pieces of which could be cut from a suceeding sheet or strip panel adjacent the first panel taking account of the defects present in such succeeding strip or panel, and cutting the pieces of the first table line from the forward end of the sheet or strip.

BACKGROUND OF THE INVENTION

This invention relates to a method for cutting material in sheet, strip or ribbon form into a number of pieces whose dimensions are predetermined by the data contained in an order book. The term "order book" is here intended to mean any compilation of the number and dimensions of the various pieces which must be produced. When it is desired to cut the pieces so listed, this can be described as "cutting the order book."

In many industries, the material from which the finished product is to be obtained is manufactured in the form of a continuous strip or ribbon after one or more consecutive processing operations, this being true, for example, in metallurgy for the production of sheet metal, in the glass-making industry and in the plastics and paper-making industries. The resulting strip or ribbon is then cut into a number of pieces, or articles, which have various dimensions, the various sizes in fact constituting the items of an order hook which is the product of the centralization of a number of orders from customers. Such pieces are the actual finished product of the particular producing industry or organization.

As a rule, the continuous strip or ribbon is systematically cut into sheets all having the same dimensions, simply by cutting the sheet at right angles to its direction of travel as the sheet advances, whereafter the sheets are removed to a subsequent treatment station where they are cut into pieces of various sizes as specified in the order book. Cutting is undertaken by a team of several workers. Each worker is assigned to selected ones of the pieces included in the order book and must produce his assigned pieces while making optimum use of the sheets and while taking into account any flaws present therein.

Although the constant length to which the sheets are cut from the ribbon is often determined experimentally to be adapted as well as possible to all possibilities of subsequent cutting, it appears that for each sheet which is cut into the pieces of the order book in general there is a loss which is due to the fact that the length of the sheet is not adapted to the particular conditions which govern the cutting of the sheet in question.

In effect, each sheet possesses a layout of defects, or flaws, peculiar to it which must be taken into consideration in the cutting. Moreover, each person has available only a part of the order book, whereas the length of the sheets is determied on the basis of a more complete order book. For each sheet taken singly, it might be found, for example, that its length is somewhat too small for the pieces to be extracted therefrom in accordance with a good cutting plan, which leads to the selection of a different cutting plan which does not, in general, fully utilize the sheet. Since this situation arises for the majority of the sheets which are to be cut, it causes substantial reduction in the degree of efficient utilization of the material constituting the ribbon.

SUMMARY OF THE INVENTION

It is a primary object of the present invention to overcome or at least substantially reduce, these drawbacks and difficulties.

Another object of the present invention is to optimize the cutting of a strip or ribbon of material into sheets, or panels, for subsequent cutting into a predetermined combination of pieces.

Yet another object of the invention is to determine the best combination of pieces to be placed on each panel, and their best arrangement thereon, before cutting the strip.

These and other objects according to the invention are achieved by a novel method for cutting a sheet or strip into a number of pieces of predetermined dimensions listed in an order book. This method includes the steps of detecting the defects present in the sheet or strip, establishing a multi-line table each line of which lists at least one piece taken from at least a part of the order book such that the sum of the dimensions of the pieces lisited in each line, measured in the direction of the width of the strip or sheet, is less than the usable width of the sheet or strip, initially exploring each line of at least part of the table in succession to locate at least one first line the listed pieces of which can be cut from the forward end of the sheet or strip, taking account of the defects present in such forward end, providing an indication if any such first line is located, subsequently exploring, in response to such indication, each line of at least part of the table in succession to locate at least one second line the listed pieces of which could, taking account of the defects present, be cut from that part of the sheet or strip which would become the forward end thereof, if the pieces listed in one first line which has been located were cut from the existing sheet or strip forward end, and cutting, from the existing forward end, the pieces listed in one such first line which has been located.

According to the present invention, a "first line," containing pieces listed in a given table line, is cut from a generally rectangular panel located at the forward end of the sheet or strip. This panel is created by a single cut transverse to the length of the sheet or strip and extending across the entire width thereof. It is for this reason that, in the detailed descriptions to be given below, reference will be made to a "first line or panel" on the strip. By assigning the pieces to be cut to such a panel, the decisions relating to the arrangement of the pieces are simplified, and it is assured that the cutting of each combination of pieces will leave a strip or sheet portion having a straight leading edge which is perpendicular to the sheet or strip length and hence which does not create additional problems with regard to the arranging of the next succeeding combination of pieces. The same considerations apply to each "second line" selected, although the second line is not usually cut as long as it is designated as a "second line."

Although the method according to the present invention is particularly well suited for use in the cutting of a continuously advancing strip of material, it is within the scope of the present invention to employ such method for the cutting of individual sheets of material.

Primarily, this method posseses the advantage of assuring that only a length of the strip or sheet will be cut which is absolutely necessary for cutting the pieces of the selected combination, i.e., of the selected first line. A better utilization of the material constituting the strip thus results.

By associating with the at least one first line a second line, the pieces of which could be cut from the part of the strip which would become its end if the pieces of the first line were cut, which second line pieces will not necessarily actually be cut, it is assured that the actual cutting of the pieces defined by the first line will not render suitable exploitation of the resulting new strip end impossible. The distribution of flaws in the strip can in fact be such that after the pieces corresponding to any first line have been cut, it is no longer possible to find a second line listing a desirable combination of pieces compatible with the defects present in the new strip end. Thus, for the cutting of the first line combination of pieces, maximum account is taken of information available relating to the exploitation of the sheets or strip.

The exploration of the multi-line table is preferably carried out with the use of a computer. This renders it possible to take into consideration a significant part of the order book, if not the whole book, and thus one has available a more extensive range of possibilities than could be taken into consideration by a person entrusted with the cutting.

When it is stated that each line of the table lists at least one piece, or a combination of pieces, this should be understood to mean not only a set of several pieces disposed in a certain manner, but alternately a single piece taken from the order book. Combinations of pieces are also considered as different when they comprise the same pieces but disposed in different manners. For example, a first combination can be constituted by three pieces of widths of which are disposed in the direction of the width of the strip or sheet to be cut. Another combination is that where these same three pieces are disposed with their lengths along the width of the strip. Yet another is that where two of the pieces have their widths, and the third has its length, disposed along the width of the strip, or sheet, to be cut. Other combinations of the same three pieces could be derived in an analogous manner. In all cases, it is, however, necessary that the total dimension of the combination of pieces measured in the direction of the width of the strip or sheet be less than this width.

The establishment of the various combinations of pieces, or single piece, to establish the lines of the table can be carried out on the basis of any criterion. It is preferably effected by means of a computer, which can be the computer which effects the subsequent exploration of the table.

For the cutting of a ribbon of window glass, the combinations can be established quite easily if account is taken of the fact that window glass is anisotropic. In this case, each of the pieces listed in the order book can be disposed on the ribbon with only one single specific orientation. Then the combinations of pieces for the table line can be established in the manner described below, which is presented only by way of example.

The pieces listed in the order book are classified, in a first stage, in decreasing order of their width, and among pieces of equal width, in decreasing order of length. In this example it is supposed that all the pieces listed in the order book must be placed with their lengths in the direction of the length of the ribbon, or strip, to be cut. From this classification a first combination is obtained by taking the widest piece listed and associating with it several other pieces which are as wide as possible, until their total width is as close as possible, without exceeding the width of the strip to be cut.

Each succeeding combinaion, or single piece, is then obtained by first replacing the last piece of the previous combination by the piece which follows it immediately in the classification, and which thus has a width less than or equal to that of the replaced piece, and then, when possible, completing the combination by adding the widest possible piece or pieces which follow the replacing piece in the classification until the total width of the combination fills the width of the strip to the maximum. In the case where the piece to be replaced is the last piece, which at the same time is the least wide piece, in the classification, the succeeding combination is obtained simply by eliminating this last piece from the preceding combination.

For isotropic materials, a similar procedure can be adopted, but account must be taken of the fact that the replacement of a piece can consist simply in a rotation of that piece by 90°.

In the establishment of the combinations of pieces, it is also possible to impose various restrictions. One such restriction can, for example, be that no more than a given number of pieces appear in any one combination. Another such restriction could be that no more than a given number of cutting lines extending in the direction of the length of the strip can be used to cut any one combination of pieces from the strip.

It is within the scope of the present invention to apply the principle of associating a first line with a second line to a greater number of lines. For example, it might be possible to consider successive first lines on the forward end of the strip, none of which will be cut until after it has been determined whether there are several table lines which can provide second lines to be associated with them, it being posible for the number of first lines taken into consideration to be equal to, or different from, the number of second lines considered.

In the course of manufacture, the strip can at certain times possess such an accumulation of defects in certain of its portions that the association of a second line, or even the selection of a first line, is impossible. In the first eventuality, the method according to the invention provides for cutting from the forward end of the sheet or strip the pieces contained in the combination of an at least one first line which can be cut from the forward end of the sheet or strip, taking into consideration the defects in this sheet or strip end. In the second eventuality, the invention provides for cutting from the forward end of the sheet or strip a piece which extends over the whole width of the sheet or strip and the length of which has been predetermined, this occurring only when it is impossible to cut this portion of the sheet or strip into the pieces of the combination of any line of the table, taking into consideration the defects.

The optimum planning thus realized takes into account the totality of possibilities offered by the strip itself. The sheet of predetermined length which extends over the whole width of the strip, and which is cut only when no other cutting possibilities exist, will hereinafter be called "warehouse sheet," since this sheet is destined to be exploited in accordance with the manual procedures conventionally used in cutting-warehouses or shops.

All of the warehouse sheets can be assigned either one single length or several different lengths as required by the personnel of the cutting-warehouse, who base their requirements on experimental data, as indicated above.

These lengths are made available to the computer but, in the cases discussed above, they do not form part of the table whose lines list the combinations of pieces or single pieces. It should be noted that the computer can directly control the tracing or cutting tools which are to act upon the sheets or strip, for example, during their movement into positions to carry out cutting of the first line which has been stored in the computer in the course of the exploration of the table.

Instead of directly controlling the tools in question, it is apparent that the computer could deliver the data relating to the first line to be cut in clear symbols at an output by means, for example, of a printing device, or inscribe it on a secondary recording means such as a perforated tape, a magnetic tape, etc., which will be utilized for controlling the cutting of the sheet or strip in a subsequent stage.

The optimum planning of the cutting which is obtained by the association of a second line with a first line to be cut can be increased if a supplementary criterion is imposed. By the exploration of the table lines, it can actually occur that several first lines will be discovered with each of which it is possible to associate a second line, and thus it is advantageous to decide upon the selection of that first line which should actually be cut. Various criteria can be used for this purpose. For example, it can be decided to cut that first line which was first encountered in the course of the exploration of the table and with which it was possible to associate a second line, thus decreasing the total computation time, or to cut that first line among the several possible first lines which utilizes the largest possible area of the strip or sheet, thus increasing the economic output of the system.

According to another feature of the present invention, from the forward end of the sheet or strip there are cut the pieces of the combination of that first line for which the ratio between the sum of the numerical values representing the cost prices allocated to the pieces of the combination and the total utilized area of the strip or sheet is the greatest possible.

The cutting in this case is thus based upon maximum economic yield which is of greater interest than a simple maximum area yield, or maximum geometric cutting efficiency.

In order to permit this criterion of maximum economic yield to be used in practice, to each of the pieces listed in the order book there is assigned a numerical value representing its cost price. Each line of the table prepared from this order book lists, in addition to the other information relating to its particular combination of pieces, an indication of the value of the ratio between the sum of the values assigned to the pieces of that combination and the total strip or sheet area required for cutting the pieces. This ratio is established by the computer at the same time as it establishes the various combinations for the table.

The total strip or sheet area required for each combination is represented by the product of the width of the strip or sheet and the largest dimension, measured in the direction of the length of the strip or sheet to be cut, which appears in the combination of pieces under consideration. The area can be determined in this manner because, as mentioned above, each "first line" is cut from a rectangular panel at the forward end of the sheet or strip.

According to an advantageous variant, there are cut from the forward end of the sheet or strip the pieces of the combination defining that the first line, or panel, which can be associated with some proposed second line, or panel, is to create, for the two associated lines, the largest realizable total of the ratios between the numerical values representing the cost prices assigned to the pieces of a combination and the total utilized area of the strip or sheet panel for each line. Normally, the associated second line is not also cut. This variant is of particular interest when numerical values representing the cost prices are assigned to the "warehouse sheets."

These "warehouse sheets" can then be incorporated in the table and be considered as pieces forming part of an order book. In the table they will appear in lines which follow the lines made up of combinations of pieces taken from the order book.

This variant presents the advantage that the resulting optimum planning relates at the same time to the possibilities of directly cutting required pieces from the strip and to the possibilities of subsequently cutting sheets in the cutting warehouse.

The variant according to the invention can also be applied when numerical values representing the cost prices are not assigned to the warehouse sheets and where these sheets are thus not incorporated in the piece combination table.

In order that the best combination of pieces which can be extracted from the forward end of the strip or sheet can be determined quite rapidly, each line of the table is preferably assigned a value representing the ratio between the sum of the numerical values representing the cost prices assigned to the pieces of the combination and the total utilized area of the strip or sheet for that table line, and the table lines are arranged in decreasing order of their ratios R. Such an arrangement is shown in FIGURE 1 to be described below. The table is then explored line by line starting from its first line.

For the purpose of deriving an association of two lines, the invention provides that for each line of the table which lists pieces that can form a first line, or panel, which can be cut from the forward end of the sheet or strip, taking account of the defects present, the table is re-explored from the begining with a view to locating at least one second line, or panel, which could be associated with the first, and when there is no second line which could be so associated with a particular first line, the exploration of the table is continued from the line immediately following the line of the table which constitutes that particular first line, and for which the combination of pieces could be cut from the forward end of the sheet or strip taking account of the defects, with a view to locating a new first line for which the combination of pieces can be cut from the forward end of the sheet or strip, taking account of the defects, and which can be associated with a second line.

The multi-line table can be assembled from the totality of pieces listed in the order book. This presents no difficulty when the order book is not excessively large. However, for very voluminous order books the exploration of a table formed from the whole of the book can cause certain difficulties. It must be remembered that after the pieces listed in the order book have been cut, they must be packed in cases or placed on or in some type of handling unit, such as stands, pallets, etc. When the whole of a voluminous order book is taken into consideration, a serious problem arises in sorting the pieces and distributing them to a large number of such handling units.

In order to avoid this drawback, the invention provides that the multi-line table be derived by exploration of only a portion, or portions, of the order book.

In particular, the selected portion of the order book lists only pieces of predetermined dimensions which are destined for a limited number of handling units.

According to another possibility which may possibly be combined with the foregoing, the portion of the order book lists only pieces of predetermined dimensions having different qualities.

This permits the establishment of a table listing a good assortment of combinations, as regards the possibilities of direct exploitation of the strip or sheets, while avoiding undue reliance on the cutting of the warehouse sheets, which must be exploited manually.

In the manufacture of a strip of material, it is inevitable that the defects which appear will be more or less serious. The seriousness attributed to each defect is a function of the quality which is required for the production of the pieces listed in the order book. For example, in the window glass industry one and the same defect can be accepted when the glass is intended to be utilized in horticulture, for greenhouses for example, whereas it is unacceptable when the glass is intended for the manufacture of automobile windshields.

In establishing a table in which various quality pieces are represented, the direct exploitation of the strip is greatly facilitated by such a classification of defects, since the defects which will appear will have a greater chance of being found acceptable for at least one of the intended qualities.

The combination of pieces which can be produced from the order book can cover collections comprising pieces the dimensions of which measured in the direction of the length of the strip or sheets possess a large disparity, which would lead to a very poor utilization of the material constituting the strip or sheets. Thus it is advantageous that the pieces of any one combination possess almost identical dimensions measured in the direction of the length of the sheet or strip.

Pieces are considered as having almost identical dimenions measured in the direction of the length when the largest difference between any two of these dimensions is less than one-half the smallest dimension which is to be found in the order book.

The pieces of any one combination preferably possess identical dimensions measured in the direction of the width of the sheet or strips, and in the case the number of pieces of a combination is equal to a whole number $n$, where the dimension of each piece measured in the direction of the sheet or strip width is less than the quotient of the width of the sheet or strip divided by $n$, $n$ being the largest divisor permitted by the width of the sheet or strip to yield bands the width of which is still greater than the dimension of the pieces measured in the widthwise direction of the sheet or strip.

The number of combinations which must be investigated for placement upon the forward end of the sheet or strip is substantially reduced by this procedure, as is also the required capacity of the computer which effects the exploration of the table and the selection of the first line to be cut from the sheet or strip and the calculation time necessary for these operations. The resultant advantage is that it remains possible to cut the pieces directly from the forward end of the strip even when the latter is being manufactured at high speeds, as is the case, for example, in metallurgical manufacture.

According to one particularly advantageous manner of carrying out the method of the invention, the piece combination corresponding to each explored line of the table is tested upon the forward end of the sheet or strip by placing that piece of the combination which has the largest dimension, measured in the lengthwise direction of the sheet or strip, with its edge along the forward edge of the sheet or strip.

The other pieces of the combination can also be placed with their edges along the forward edge of the sheet or strip, or, according to a modified procedure, can be placed in a band extending over the width of the sheet or strip and having a length, in the direction of such width, which is equal to the largest dimension of such other pieces. This second possibility envisaged permits a better exploitation of the material, but at the same time necessitates a computer of greater capacity and increases the calculation time. The selection of one or the other possibility depends essentially upon the manufacturing speed of the strip.

Although the combination can be tested upon the end of the sheet or strip in any manner whatever, the present invention provides that the combination of pieces corresponding to each explored line of the table be tested upon the forward end of the sheet or strip according to a predetermined number of placement plans, or patterns. Thus it is possible to either increase or diminish the number of placement plans very easily so that the speed of the cutting decisions can be made to follow any variations in the manufacturing speed of the strip. For the computer, these various placement plans constitute in fact sub-programs which can be placed into or out of circuit with the principal program without the necessity of modifying the latter.

For the same reasons, for each tested placement plan, it is necessary to verify whether any defects are then located in the pieces of the combination.

As already stated above, the cutting method according to the invention preferably makes use of a computer to carry out certain phases of the method. Thus the present invention also has for an object a program which controls the operations of the computer with a view to carrying out the method. The computer can be of any well-known type now on the market, as for example an I.B.M. 1800 machine.

The program for the cutting of materials in sheet or strip form, according to the present invention, carries out an exploration of the multi-line table, each line of which comprises a combination of pieces taken from at least a part of the order book and combined such that the sum of the dimensions of the pieces measured in the direction of the width of the strip or sheet is less than the usable width of the strip or sheet, until at least one first line is encountered whose combination of pieces can be cut from the forward end of the sheet or strip, taking account of the defects, the program then carrying out a re-exploration of the table with a view to associating with the first line at least one second line whose combination of pieces can be cut, taking account of the defects, from the new forward end of the sheet or strip which would appear if the combination of pieces of the first line were cut.

The program thus defined can further possess all of the characteristics necessary to adopt the various possibilities which have been described above for the method and which it is not necessary to describe again here. The program for carrying out the invention can be recorded on any type of carrier, such as punched cards or tapes, magnetic tapes, etc., either in clear language or coded language, or can even be directly stored in the computer memory elements.

Figure 7:
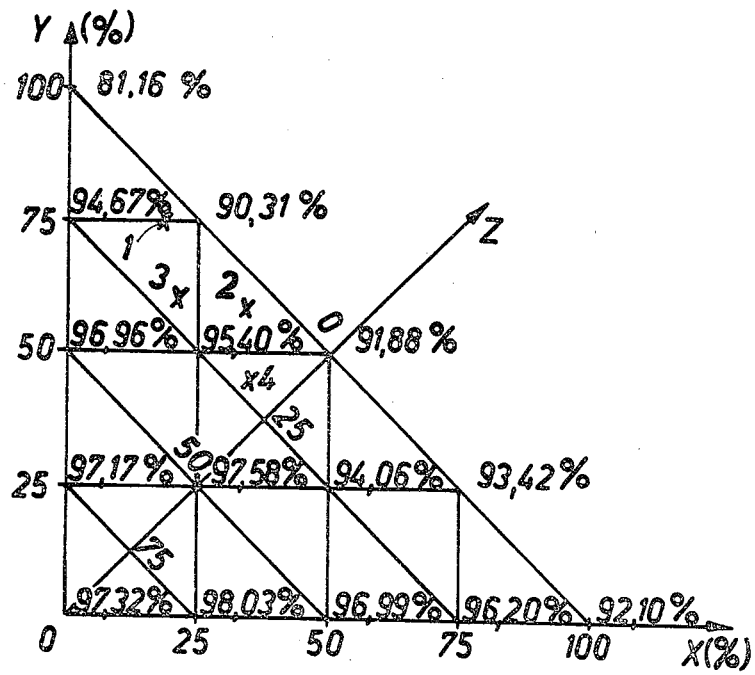

FIGURE 7 is a diagram showing geometric cutting yields as a function of the composition of the order book.

Figure 8:
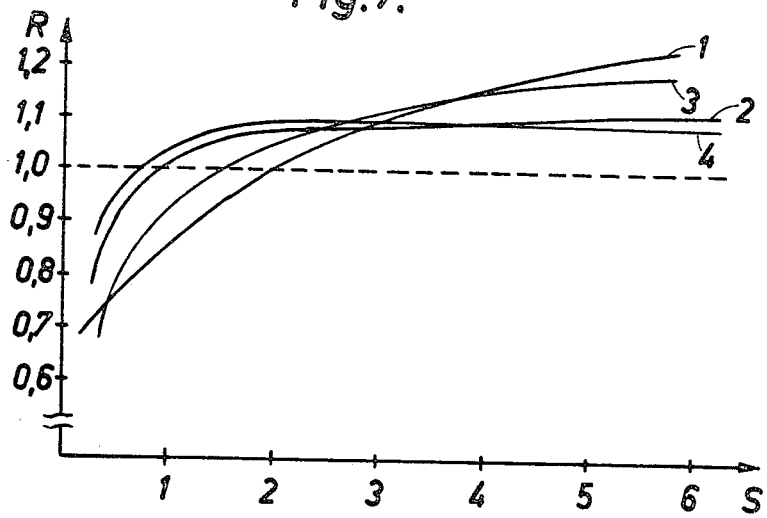

FIGURE 8 indicates in a diagram containing a series of curves representing the variation of the ratio R between the marginal cost price and the area S of the piece as a function of their area S for different compositions of the order book.

Figure 9:
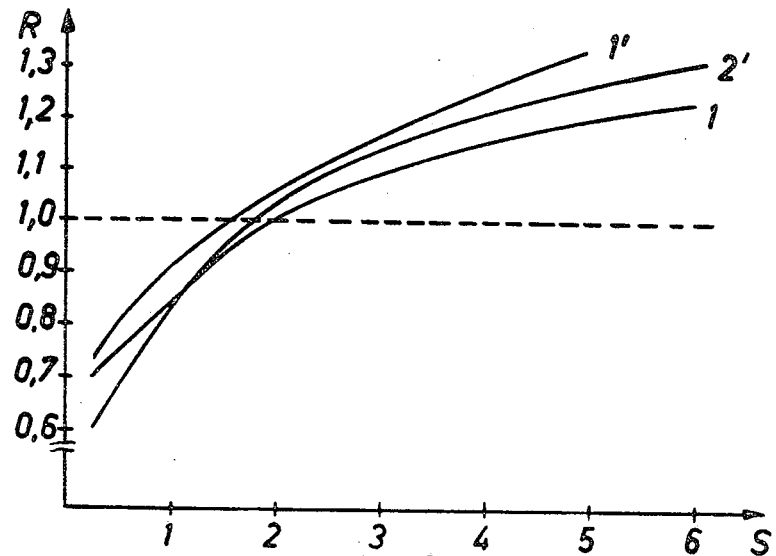

FIGURE 9 is a diagram similar to that of FIGURE 8 in which the influences of certain contingencies are indicated.

DESCRIPTION OF THE PREFERRED EMBODIMENTS

The examples shown in the drawings and to be described below do not constitute a limitation of the invention, as the latter covers all modifications which can be imparted to the described examples and which come within the scope of the invention.

The following description describes the application of the method according to the invention to the cutting of a continuous web, or strip, of glass. It is apparent that the process can be applied in analogous manner to other materials which occur in the form of a web, such especially as sheet metals, paper, plastic materials, wood, etc. We assume that the different calculations and the decisions for the determination of the plan in accordance with which the end of the strip will be cut are effected by a computer.

Firstly, the computer must be furnished with all the data relating to the strip to be cut, that is to say essentially the effective width of the glass strip and the position and importance given to the individual defects, or flaws.

In the case of glass, the effective width is different from the total width of the glass, since in the drawing of the glass strip the edge-forming elements must act upon the strip to keep it to the desired width. These edges must be subsequently eliminated, which is generally effected by a continuous cut by means of a tool which is permanently positioned to act upon the strip. The width of the edge which is to be eliminated is variable in the course of manufacture, causing corresponding variations in the useful width of the strip. This useful width can be measuered manually and introduced, via a keyboard, into the computer, or it can be detected automatically by determining the distance between the two tools which have the task of cutting the edges, this distance being immediately introduced into the computer, for example in coded form.

The positions of the defects, or flaws, can also be determined manually or automatically. In the latter eventuality, a bank of photoelectric cells is disposed above the glass strip. The reference axes for the coordinates of the defect locations are taken along the forward edge of the strip and along one of the lateral edges which determine the useful width of the strip, i.e., the position of one of the tools which have the task of cutting the edges.

The importance, or seriousness, of each defect is determined by visual inspection of the strip. The workman entrusted with this inspection indicates the importance of each defect by a color mark placed upon the defect, a different color being utilized for each degree of importance of the defect. These marks are then detected by the bank of photoelectric cells which have the task of determining the coordinates of the defects, the bank comprising as many rows of cells as there are degrees of defect importance, and each row being sensitive to only one of the colors utilized for the marking. The way in which such an arrangement can be formed is well known to those skilled in the art.

Thus, for window glass, for example, three flaw categories can be created: those defects which are not acceptable even for the manufacture of glass panes intended for horticultural green houses and which are marked in red; those defects which are not acceptable for glass intended as windows for buildings, which firstly cover all the preceding defects and secondly others which will be marked in green; and those defects which would not be acceptable in automobile windshields, comprising the flaws of the two previous categories plus others which are marked in black.

When the determination of the coordinates of the defects is effected manually, marking is not essential, as the workman in charge of detection can also decide upon the importance of the defects and introduce all of the data, by keyboard, into the computer.

Beside the data relating to the strip, the computer must receive data concerning the pieces listed in the order book, including their dimensions, the number of copies of each piece, the quality which each piece is to have, the numerical values representing the cost price attributed to each piece, the destination of the pieces, etc.

Furthermore, the computer must also be supplied with the number and lengths of the warehouse sheets or stock sheets to be cut. When the warehouse sheets are considered as forming part of the table established from the order book, the computer must also be supplied with the numerical values representing their cost prices.

From this data relating to the order book, the computer will establish a multi-line table comprising a good assortment of pieces, both from the viewpoint of their dimensions and of the choice to be obtained, with the restriction that the pieces be intended for a limited number of handling units which can be stands, or containers. This restriction eliminates difficulties which would otherwise arise in the sorting of the pieces. By successive explorations of the order book, the computer selects the pieces intended for one stand of large format, one of medium format, and one of small format for each of the qualities to be obtained, making nine stands in the case considered above for three quality choices to be obtained. By large format there is meant, for example, pieces having an area greater than 3.5 sq. m., by small format there is meant pieces the area of which is less than 1 sq. m., the pieces of medium format having areas between these two values.

From this selection of pieces the computer establishes the different combinations, for example according to the procedure which has been described above, ensuring that each combination comprises only pieces of the same quality and of dimensions which, measured in the lengthwise direction of the strip, are almost identical. As it is a matter of window glass, it is not necessary to take into consideration the possibility of rotating the pieces through 90° to determine their possible placement on the strip.

It is apparent that the establishment of the combinations can be effected in accordance with any other procedure whatever. Thus the combinations can comprise only pieces of identical widths. In an order book it appears that a large number of copies, or units, of the same format can be required. Frequently all these pieces of the same format are intended for the same customer, and thus it is advantageous to leave them grouped in the cutting, which accelerates their subsequent loading or packing for shipment.

Whichever procedure is utilized to establish the lines of the table, the computer determines, for each line, the ratio R between the sum of the numerical values representing the cost prices of the pieces listed in that line and the total area of the strip utilized for making these pieces, and it then classifies, or arranges, the lines in the order of decreasing values of these ratios.

Figures 1, 6:
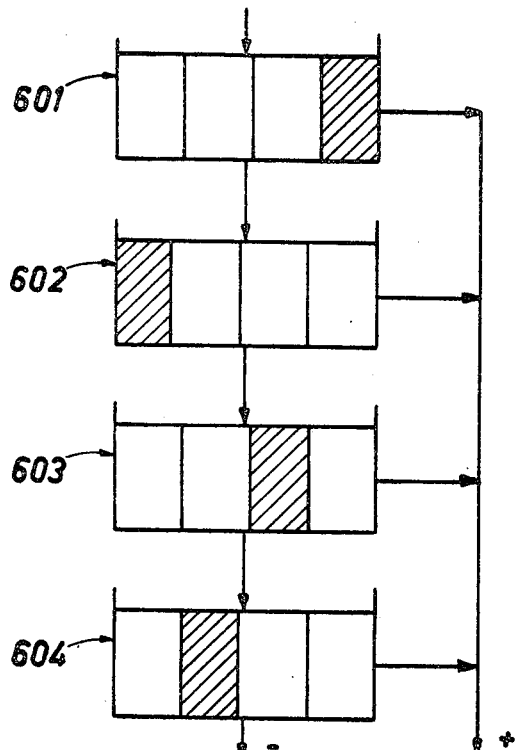
FIGURE 1 shows a part of a table, each line of which lists a combination of the pieces included in the order book which is to be cut from the sheet or strip.
FIGURE 6 is a view similar to that of FIGURE 5 of a part of a similar procedure for placing combinations of three pieces.

The table thus obtained is ready for use in determining the manner of cutting the glass strip. An example of a part of such a table is shown in FIGURE 1. This table relates to the case where only pieces having the same dimension measured in the lengthwise direction of the strip are listed in each line.

The column I indicates the sequence number of each of the lines. The combination of pieces relating to each line is indicated in columns XF and YF which give, respectively, the dimensions of the pieces in the widthwise, or Y, direction and the lengthwise, or X, direction of the strip.

The number of dimensions indicated in each line of column XF at the same time gives the number of pieces occurring in the combination of that line. This number is indicated in the column C. The computer must also have an indication available relating the quality to be obtained. This is presented in the column Q, where the numbers 1, 2 and 3 correspond to the three quality categories, or levels, which were described above, by way of example, category 1 being the highest. These same three numbers are also utilized for the identification of the category of each defect by the computer, category 1 representing the least serious defects. Thus they correspond to the three types of marks which are placed on the glass to identify the defects. When the quality to be obtained is referenced by the number 3, this signifies that the particular pieces of glass can contain the defects referenced by the numbers 1 and 2, while the defects referenced by 3 are not acceptable. When the quality to be obtained is referenced by the number 2, the defects referenced 2 and 3 can not be found in the finished pieces while the defects of category 1 can be accepted. The same thing is valid for the quality 1, for which defects referenced 1, 2 and 3 are to be excluded from the piece.

The last column R of the table gives, for each line, the value of the ratio between the sum of the numerical values representing the cost prices allocated to the pieces of the combination located in that line and the total area of the strip utilized for making those pieces.

Figure 2:
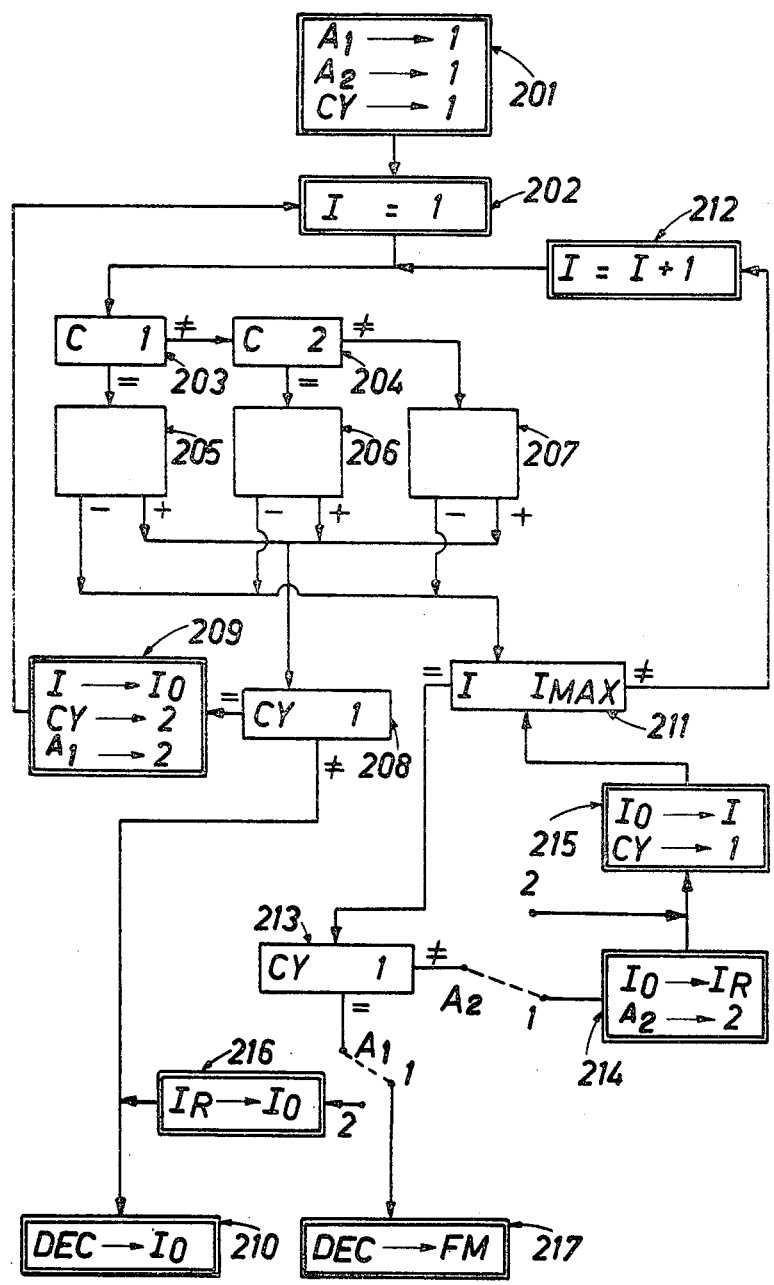
FIGURE 2 is a diagram illustrating, by means of logic symbols, one embodiment of the method for the determination of a cutting plan according to the present invention.

From the information in the table, and from that relating to the defects, the computer will determine a cutting plan according to which the end of the strip will be cut. A logic operation circuit for this determination is shown in FIGURE 2 and represents the program for the computer or the layout of a suitable special purpose computer all of the elements of which are well known in the art. In FIGURE 2, the double-outlined elements represent decision elements, while the single-outlined elements represent arithmetic elements. In order not to overburden the drawings, the elements relating to routine operations, such as access, extraction and reintroduction of data in the store, the removal from the table of lines for which the pieces have been cut, the entry of values, etc. have not been represented. Moreover, no further reference will be made thereto in the rest of the description. These conventions will also be valid for the other figures which will be described hereinafter.

The procedure for determining the desired cutting plan, or pattern, starts with the element 201 which places switches $A_1$ and $A_2$ into their position 1 and gives the value 1 to CY indicating thereby that it is desired to select a first line, or panel, to be cut from the strip. From the element 201, a shift is then made to the element 202 which gives the value 1 to I in order to select the contents of line No. 1 of the table. The comparison elements 203 and 204 then inspect the nature of the combination of pieces which constitutes the line taken into consideration, this involving a comparison of the value which is found in line No. 1 of column C of the table with the numbers 1 and 2. Since the value of C for line No. 1 is equal to 1, a shift is made to the element 205 which has the task of determining how to cut an arrangement of the single piece from the end of the strip according to different pre-established plans or patterns. If the value of C were equal to 2, the element 203 would confirm its inequality with 1 and a shift would be made to the element 204 which, confirming the equality of C with 2, shifts to the element 206. The latter has the task of determining the possible ways of cutting arrangements of the two pieces from the end of the strip. If the elements 203 and 204 indicate, respectively, a difference between C and both the values 1 and 2, this signifies that the combination of that line of the table comprises three pieces and a shift is made to the element 207 which has the task of determining the manner in which arrangements of these three pieces can be cut from the end of the strip.

In this example, we have assumed that the number of pieces appearing in a given combination will not exceed three. Obviously, for this purpose, any other limiting value could be selected.

The description of the operation of the elements 205, 206 and 207 will be given subsequently in detail.

When, for the line then under construction, whichever of the elements 205, 206 and 207 carrying out the investigation supplies a positive (+) response, indicating that the combination of pieces associated with that line of the table can be cut from the strip, a shift is made to the element 208 which compares the value CY with 1. In the case of equality, which signifies that the line of the table taken into consideration is destined to constitute a first line, operation shifts from element 208 to the element 209. The latter puts into store $I_0$ the number of the table line I in question and gives the value 2 to CY indicating thereby that the determinaion of a second line to be associated with the line whose number is stored in $I_0$ will be effected next. This element 209 also puts the switch $A_1$ into its position 2. From the element 209 one then returns to the element 202 and the same procedure as described above recommences until the element 208 is reached again. For this purpose we suppose that one of the elements 205, 206 or 207 has again given a favorable response.

Since such favorable response relates to a second line, the element 208 will confirm the difference between CY and 1, as a result of the passage, which the program has made through the element 209. In this case, a shift occurs from the element 208 to the decision element 210 which decides to make the cut DEC spaced from the forward end of the strip to produce the pieces of the combination listed in the line whose number has been put into $I_0$, the pieces being arranged in the manner of placing which in the element 205, 206, or 207 has given rise to a positive response for this table line. This cut is effected according to the plan found to be desirable by one of the elements 205, 206 or 207.

The cutting plan selected, in the hypotheses hitherto made of a positive response by one of the elements 205, 206, 207, is constituted by a first line with which a second line has been associated, each of these two lines being itself constituted by line No. 1 of the table, due to the fact that each cycle of the program passed through the element 202.

This particular situation will occur only very rarely in practice, and it is necessary to envisage other possibilities.

Let us suppose that for the determination of either a first line for removal from the strip or a second line associated with the first, that one of the elements 205, 206 or 207 which has been activated gives a negative (−) response, indicating that the combination of pieces listed in line No. 1 of the table can not be cut from the strip. In this case, a shift is made from that one of these elements to the element 211 which checks whether or not the line under consideration is the last line $I_{MAX}$ of the table. If not ($\neq$) the element 212 is activated to the value of I by one unit, that is to say, the following line of the table is brought under investigation. For such investigation, the program passes again through certain of the elements 203 to 207 based on the data contained in this next line of the table. Thus, by way of the loop 211, 212, the table can be examined line by line, starting from line No. 1, until a line is discovered whose contents can be selected to form the first line, or panel, for removal from the end of the strip. The same thing is done for the determination of the second line, or panel, for association with the first line.

Another eventuality to be envisaged is one in which it is not possible to associate a second line with the first line found initially in the table.

Let us suppose that by the passage of the program through certain of the elements 201 to 207, 211 and 212, a first line for extraction from the strip has been determined in the manner described above. One of the elements 205, 206 or 207 thus having given a positive (+) response, program development terminates at the element 208. As it is a matter of a first line, CY is equal to 1. Therefore, a shift occurs to the element 209 which puts the number I of the selected table line into $I_0$, gives the value of 2 to CY, and causes the switch $A_1$ to move to its position 2. Then, a transfer is again made to the element 202, and then through certain of the elements 203 to 207, 211 and 212, for the purpose of locating a second line for association with the first.

Since it is assumed that such a line does not exist, the loop 211, 212 will be passed through as many times as there are lines in the table until the last line of the table is reached. When this is reached, I is equal to $I_{MAX}$ and a shift then occurs from the element 211 to the element 213 which checks whether the process is in the phase of locating a first or a second line, or panel, for the strip. Since here it is a matter of a second line, CY is different from 1 ($\neq$) and the program passes through the switch $A_2$ which has been placed in its position 1 as a result of the operation of element 201. The element 214 is then activated to put the number $I_0$ of the first table line which was the first to be retained into the store $I_R$ and to move switch $A_2$ to position 2. Then a shift is made to the element 215 which makes the decision of giving I the value of the number of the line retained in $I_0$ and which restores the value of 1 to CY, that is to say, a search will be made for a new first line or panel.

By passing again through the element 211, the program determines whether it is still possible to find such a line, by checking whether or not the line I taken into consideration is the last in the table. If this is not the case, according to the procedure already described, the program again passes through the elements 202, 203 to 207, 211, 212 in order to locate a new first line. When such a line is found, passage is effected through the elements 208 and 209 and back to the element 202 for the purpose of locating a line of the table whose contents can serve as a second line, or panel, for association with the pieces listed in this new first line. The number I of this new first line is stored in $I_0$ by the element 209.

A second line having been found, again by the passage of the program through the elements 203 to 207, 211 and 212, the program again terminates at the element 208. Since in this phase CY is different from 1, operation passes from element 208 to the element 210 which decides to cut the combination of pieces listed in the table line whose number was stored in $I_0$, i.e., the new first line, or panel, with which a second line, or panel, could be associated. The line $I_0$ entered in $I_R$, which was the first line detected in the first instance, and with which it was not possible to associate a second line, or panel, is not retained.

In the eventuality where it is again impossible to associate a second line with the fresh first line retained in $I_0$ by the element 209, after the program has passed through the loop 203 to 207, 211, 212 as many times as there are lines in the table, the program will again reach the element 211 with equality existing between I and $I_{MAX}$. The program will then pass through the element 213 and from there to the switch $A_2$ which was moved into its position 2 when the program passed through the element 214 in the search for the second line, or panel, for association with the first line which was initially retained, and the number of which is retained in $I_R$. Therefore, from the element 213, if CY is unequal to 1, a shift occurs directly to the element 215 with a view to again seeking another first line with which a second line could be associated. Such a first line is sought by passing again through the elements 211, 212, 203 to 207, 211, 212.

We assume that such other first line does not exist. In this case, after again reaching the element 211 with I equal to $I_{MAX}$, the program passes to the element 213, which this time confirms that CY is equal to 1, causing passage through the switch $A_1$. The latter is situated in its position 2 as a result of having been moved there when the element 209 was activated. The element 216 where the program then terminates enters the number of the table line retained in $I_R$ at $I_0$ and the element 210 then makes the decision to cut the combination of pieces listed on this line. Thus, the cutting of the end of the strip is effected to cut out the combination of pieces listed in the first table line which was retained in the first instance when the association of a second line with any one first line proves impossible.

A last eventuality to be envisaged is that where, starting from the element 201 and passing through the elements 202 to 207, 211 and 212, it is found to be impossible to locate a first line of pieces which can be extracted from the forward end of the strip. In this case, again the program terminates at the element 211 with I equal to $I_{MAX}$, which involves passage of the program towards the element 213. Since CY has been made equal to 1 by the element 201, the program passes to the switch $A_1$ which is situated in its position 1, also due to the action of element 201, to arrive at the element 217 which in this case decides to cut a warehouse sheet FM from the leading end of the strip.

Figure 3:
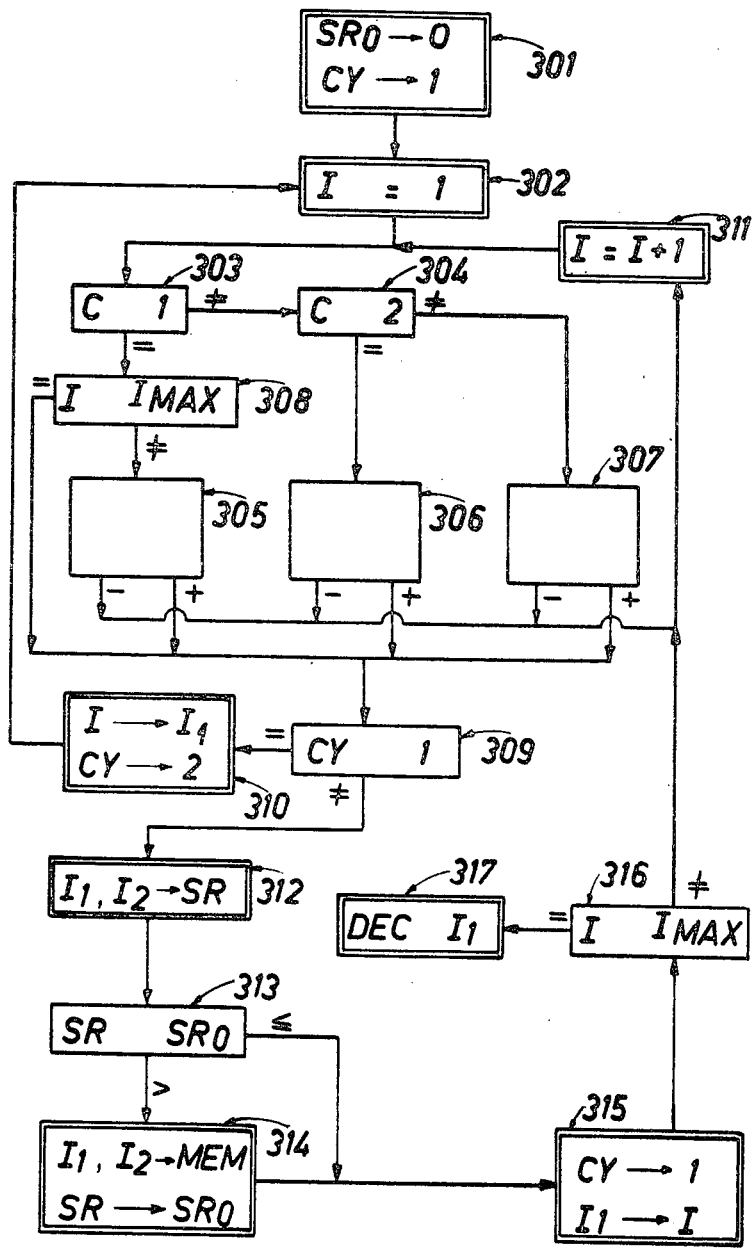
FIGURE 3 is a view similar to that of FIGURE 2 of another embodiment of the method.

The circuit of FIGURE 3 relates to a variation of the above procedure according to which each first line retained is associated with a second line and the leading end of the strip is cut according to the combination of the pieces of the first line of that association of two lines which presents the largest possible sum of values R of all of the possible pairs of associated lines. In this connection, it should be noted that the lines of the table of FIGURE 1 are arranged in order of decreasing values of their ratios R.

In this variant the warehouse sheets are considered as forming part of the table and constitute the last lines thereof. In the example which will be described hereinafter, only one single table line is envisaged for one single dimension of the warehouse sheets. This line being the last, it is represented by $I_{MAX}$. For the warehouse sheet, the value of C is taken as equal to 1.

The start of the procedure is effected from the element 301 which gives a value of zero to $SR_0$.

$SR_0$ represents the best value found for the sum of the values R of two associated lines. This element 301 also gives a value of 1 to CY, thereby indicating that the object is to find a first line to be placed at the end of the strip.

The elements 302 to 307 carry out the same functions as the elements 202 to 207 of FIGURE 2. It is not necessary to describe their operation again for the present example.

However, between the elements 303 and 305 there is inserted a supplementary element 308 which causes the element 305 to be bypassed if element 308 finds that the line under consideration is the last line $I_{MAX}$ of the table.

Since this last line corresponds to the warehouse sheet, it is in fact unnecessary to carry out tests to check whether it can be extracted from the forward end of the strip, this sheet being by definition always capable of being so extracted.

As in the case of FIGURE 2, from the element 302 the program passes several times through the elements 303 to 308 and 311 to locate a line of the table whose pieces can constitute a first line, or panel, for removal from the forward end of the strip. The element 311 performs the same function as the element 212 in FIGURE 2.

As soon as a first such line is located, the positive response of one of the elements 305, 306, 307 or 308 activates the element 309 which compares the present value of CY with 1. Since a first line is involved in this case, there is equality (=) and the program shifts to the decision element 310. The latter enters in $I_1$ the number of the selected line and gives a value of 2 to CY.

The element 310 then activates the element 302 for the determination of a second line, or panel, for association with the first by causing the program to run through the elements 303 to 308 and 311. Such a second line always exists, since the last line $I_{MAX}$ of the table is constituted by a warehouse sheet which can always be cut.

When the element 309 is reached during the search for this second line, this element confirms the difference between CY and 1 and there is a shift to the element 312 which obtains the total SR of the ratios R relating to the pieces listed in the lines $I_1$ and $I_2$ retained respectively as associated first and second lines. The total SR is compared in the element 313 with the value which $SR_0$ possesses. If SR is greater than $SR_0$, the element 314 puts the two associated lines $I_1$, $I_2$, into store MEM and gives $SR_0$ the value of SR in relation to these two lines. On the other hand, if SR is less than or equal to $SR_0$, which signifies that the combination is not better than that already put into store MEM, a shift is made directly to the element 315, where CY is given a value of 1 and I is given the value of $I_1$ with a view to continuing the exploration of the table to determine another association of two lines, starting from the table line immediately following the line which was last selected as a first associated line $I_1$ by the element 310. For this purpose, the program passes through the element 316 to the element 311. The purpose of the element 316 is to check whether the line which has just been examined is the last one in the table, in which case it is no longer necessary to explore the table, the latter having been explored completely.

When the element 316 confirms identity (=) between I and $I_{MAX}$ a shift is made to the element 317 which decides to cut the pieces of the line $I_1$ which is found at that moment in the store MEM and which was put there by the element 314.

The circuit which has just been described thus effects the exploration of the table line by line, from line No. 1 to the last line, to locate all the table lines whose pieces can constitute the first line, or panel, for removal from the forward end of the strip. For each table line retained to represent such a first line, the circuit immediately determines a second line for association therewith, by exploration of the complete table, before continuing to search for a new first line or panel.

The value SR of each association of two lines is compared immediately with the value $SR_0$ which is in the store (element 314) and the association having the highest value is retained. Thus, throughout the course of the operations, only the data relating to the highest value association of two lines is to be found in the store.

Figure 4:
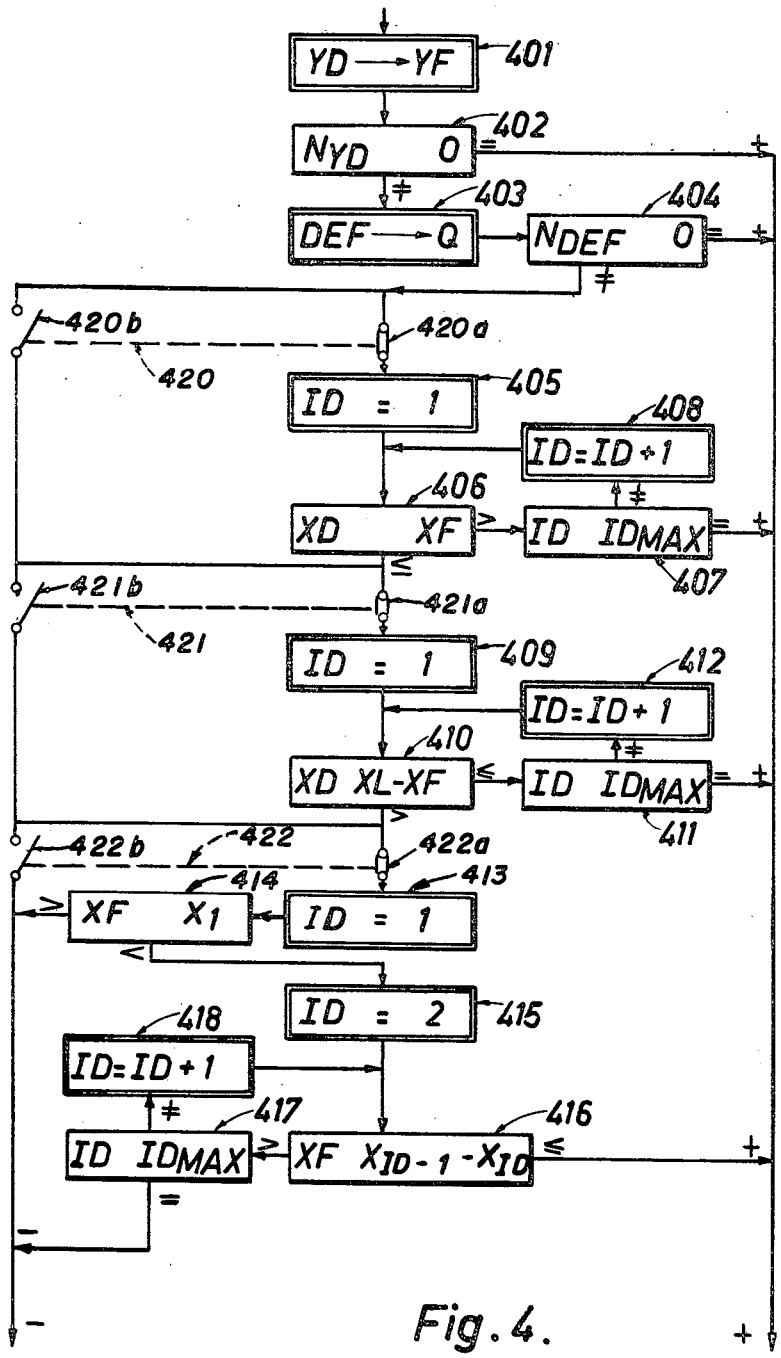
FIGURE 4 is a view similar to that of FIGURE 2 setting forth the procedure for the tests for placing one single piece according to pre-established patterns.

FIGURE 4 shows an example of an arrangement of logic operations for carrying out the tests necessary to determine the desired way to cut the forward end of the strip when the table line selected for cutting out the first line, or panel, of the strip lists but a single piece. Thus, this circuit can be utilized as the element 205 or 305 of the circuit of FIGURE 2 or 3.

The circuit according to FIGURE 4 includes at its forward end several elements which have the task of selecting the defects which must be taken into consideration for the piece which is to be positioned. The defects are assumed to be classified by decreasing order of their coordinate XD measured in the direction of the width of the strip.

From the list of defects which the computer has in its memory store and which is normally large for the single piece which is to be removed from the strip, the element 401 retains only those whose coordinate YD in the lengthwise direction of the strip is less than YF, which is the dimension of the piece measured in the direction of the length of the strip. Then, the element 402 compares the number $N_{YD}$ of the defects thus retained with zero.

In the case of equality, i.e., no defects along the length YF, the cut is obviously possible, and from the element 402 a signal passes directly to the positive output.

When the element 402 determines that $N_{YD}$ does not equal zero, the element 403 retains information relating only to those defects DEF which are to be taken into consideration for the quality Q of the piece to be produced.

Passing then to the element 404, the number $N_{DEF}$ of these retained defects is compared with zero. In the case of equality a signal passes immediately to the positive output, so that the circuit gives a positive response, the cut then being still possible. On the other hand, when such defects exist, a shift is effected towards the element 405, which selects that defect line ID which has been assigned the number 1, the defects retained from element 403 being normally classified in several successively numbered lines the last of which is identified by $ID_{MAX}$.

For each line ID, the element 406 compares the distance to the flaw coordinate XD along the width of the strip from one of the lateral edges of the strip taken as a reference with the dimension XF of the piece under consideration. This corresponds to a test of whether the piece can be disposed along the lateral strip edge which has been taken as a reference for the flaw coordinate XD. This edge can be the true edge of the strip or, in fact, the edge of the useful width of the strip when the original strip edge must be trimmed.

If the dimension of XD is less than XF, the piece can not be cut in the intended position and operation passes to the set of elements 409 to 412. On the other hand, when XD is greater than XF it still can not be concluded that the piece can be cut. It is necessary in fact that this relationship be verified for all the defects retained by element 403. As soon as one such defect is found to possess a coordinate XD whose distance from the reference edge is less than XF, element 406 indicates that the proposed cut is not possible. It is for this reason that, after each determination that $XD > XF$, operation passes from the element 406 to the element 407 which compares the number of that line ID whose XD coordinate has just been examined, with $ID_{MAX}$ and which, if there is no equality, i.e., if ID is not $ID_{MAX}$, passes on towards the element 408. The latter, by adding a unit to the value of ID, causes the next succeeding defect listed to be taken into consideration and examined.

As soon as a defect does not satisfy the condition that XD be greater than XF, the element 406 shifts operation immediately towards the group of elements 409 to 412. On the other hand, when all of the defects satisfy the condition that XD be greater than XF, the element 407, after inspection of the last defect, confirms that ID of the last defect is equal to $ID_{MAX}$ and sends a signal to the positive output.

The group of elements 409 to 412, which is activated when XD is less than XF, carries out the same operations and operates in the same manner as the group of elements 405 to 408 which has just been described, but this time testing the piece against the other lateral edge of the strip, i.e., that edge which is not taken as a reference for the flaw coordinate XD. Thus, the sole existing difference is that the element 410 compares XD with the difference $XL - XF$, where XL represents the useful width of the strip. This useful width is equal to the width of the strip when there are no waste edges. When the distance to the coordinate XD of one of the flaws is greater than $XL - XF$, the element 410 immediately sends the succession of operations to the group of elements 413 to 418, which has the task of trying to position the piece between the defects. Here again the element 413 selects ID No. 1 for starting the investigation. In fact these tests consist in finding a combination of two successive defects in the list of defects classified in decreasing order of their coordinate XD in the direction of the width of the strip, such that the difference between these coordinates is greater than the width dimension XF of the piece which is being considered.

For this purpose, operation passes from the element 413 to a first element 414 which compares XF with the XD coordinate $X_1$ of the first defect listed. If XF is greater than $X_1$, which signified that the piece cannot be placed between the reference edge and the defect having the highest coordinate the element 414 sends a signal representing a negative response to the negative output. In the other eventuality ($XF<X_1$), the element 415 selects ID equal to 2 and operation passes to the element 416 which will review the difference between the XD coordinates of each successive pair of defects by successive passages through the loop of elements 417 and 418. When a pair of successive defects is found for which the difference ($X_{ID-1}-X_{ID}$) is greater than or equal to XF, a signal will pass immediately from the element 416 to the positive output. If no such pair exists, a time will be reached when the passages through the loop 417, 418 will render ID equal to $ID_{MAX}$ and in this case a negative response signal is sent toward the negative (—) output.

In the logic operations circuit of FIGURE 4, there are provided thre switches 420, 421 and 422, each having two contacts 420a, 420b, 421a, 421b, and 422a and 422b, respectively, each controlled in such a manner than when a contact "a" is closed, the corresponding contact "b" is open, and vice versa. The contacts "a" are inserted into the direct connection between the various elements, as described above and as is sufficiently clear from the drawing. The contacts "b" are each inserted into a single line which permits selected ones of the groups 405 to 408, 409 to 412 and 413 to 418 to be circumvented at will. This permits certain tests to be eliminated, for example with a view to reducing the calculation time, at certain moments in the course of manufacture.

In the position of the switches shown in FIGURE 4, all of the logic elements are to be employed. When one of the switches, for example the switch 420, is brought into its other position, the contact 420a is opened while the contact 420b is closed. Therefore, in the course of the procedure operation passes immediately from the element 404 to the element 409 provided that the contact 421a is closed.

When all the contacts with the index "b" are closed, this indicates that no further line of the table corresponding to a single piece will be cut, the closure of the contact 422b ensuring the delivery of a negative response to the negative output. This can be of interest in certain cases when it is desired in the course of manufacture to give priority to the cutting of certain lines of the table without it being desired to modify the value R of these lines.

Figure 5:
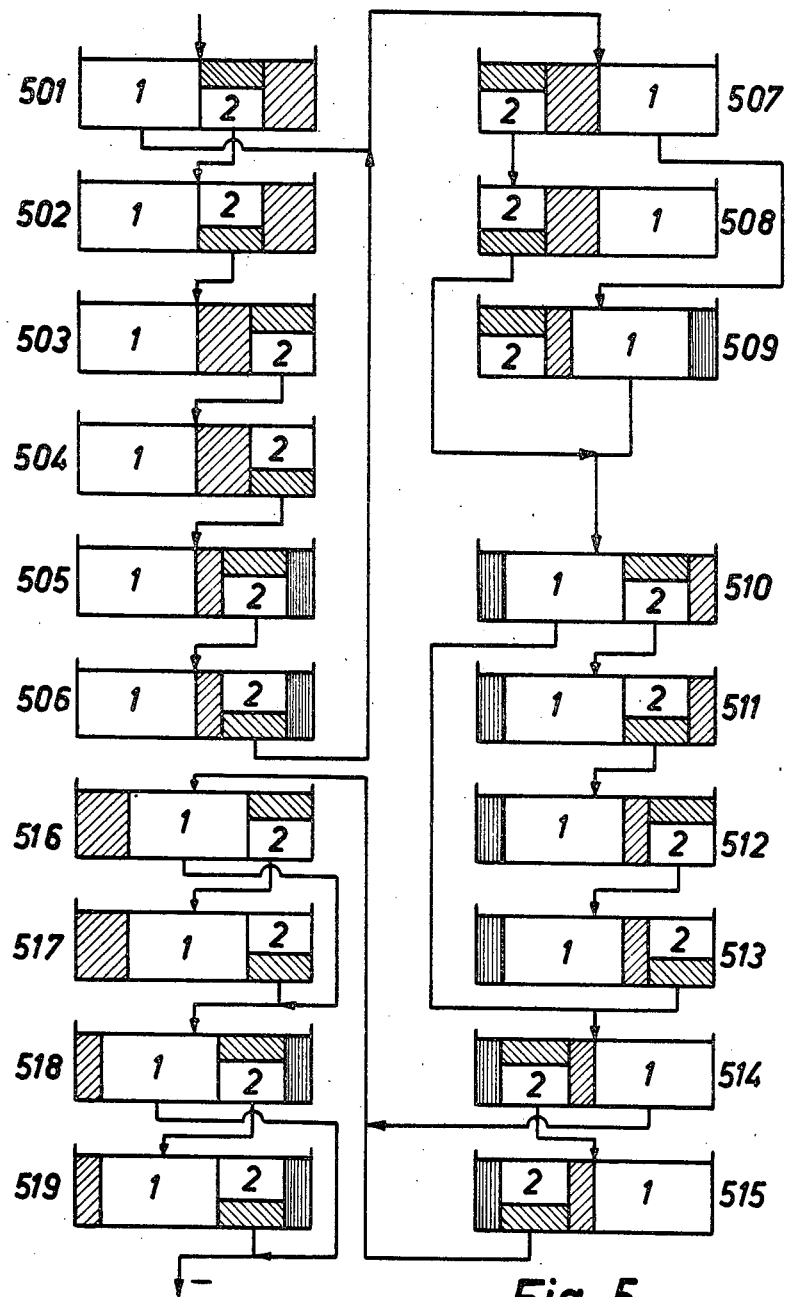
FIGURE 5 is a simplified block diagram of the procedure for placing combinations of two pieces.

In FIGURE 5 there is represented in diagrammatic fashion the succession of logic operations for arranging upon the forward end of the strip a line, or panel, made up of a combination of only two pieces 1 and 2. Each group, or element, in FIGURE 5 illustrates in plain fashion the manner in which that element places the pieces on the forward end of the strip, without there being shown the various groups of elements which, for the manner of placing shown, ensure the desired comparisons between the dimensions of the pieces and the coordinates of the defects. The arrangement of these groups of elements is similar to that described in FIGURE 4, except that the number of comparisons to be effected is higher. The leading edge of the strip is represented by the lower horizontal line in each element shown.

The logic circuit of FIGURE 5 can be utilized, for example, as the element 206, or 306 of FIGURE 2 or 3.

As in the case of FIGURE 4, the circuit of FIGURE 5 begins with elements which effect the selection of the defects to be taken into consideration. These elements are identical with the elements 401 to 404 of FIGURE 4 and for this reason have not been shown in FIGURE 5.

Each of the elements shown in FIGURE 5 can produce a positive response in a manner analogous with that, and under conditions similar to those, of FIGURE 4, and the lines on which such positive responses would appear are not shown. Only the negative response lines have been represented.

The example in FIGURE 5 relates to a case where the pieces of the combination have different dimensions YF measured vertically, or in the direction of the length of the strip.

After the selection of the defects has been effected, the placing of the two pieces 1 and 2 upon the forward end of the strip is effected in the manner represented in 501 and a group of elements (not represented, but which for ease we shall consider to be incorporated in 501) effects an inspection of the defects to ensure that no defect is contained in the pieces thus placed. If this is the case, the group 501 sends a positive response.

On the other hand, when it appears that a defect is situated within the piece 1, passage is effected directly towards the group 507, as represented by the line which leads from the piece 1 of group 501 to a group 507 which places piece 1 in the manner represented.

When, in the manner of placing of group 501, there is no defect in the piece 1, but a defect is located in the piece 2, attempts are made to place the piece 2 successively in the different positions shown at 502, 503, 504, 505 and 506. This succession is followed until a manner of placing is found for which no defect lies within the piece, in which case the group which confirms this possibility sends a positive response.

In the eventuality that none of the groups 502 to 506 gives rise to a positive response, operation passes to test the manner of placing shown at 507.

The procedure which is followed in the event of a negative response from group 507 relating to either piece is shown with sufficient clarity by the negative response lines shown in FIGURE 5 between groups 507 to 519, so that it is not necessary to describe them in greater length.

Briefly, it can be said that at 508 the piece 2 is placed in another position, while at 509 the piece 1 is placed in the right-hand portion of the strip but against a defect. In 510 to 513, the piece 1 is placed in the left-hand portion of the strip against a defect, while the piece 2 occupies various positions. The piece 2 is placed in various positions in the left-hand portion of the strip against a defect in 514 and in 515. The groups 516 and 517 place the assembly of the two pieces 1 and 2 against the right-hand edge of the selected strip portion, while the groups 518 and 519 place the assembly of the two pieces against a defect in the right-hand portion of the strip.

It is apparent that the number of possible ways of placing the two pieces can be increased or decreased, for example by also placing the piece 2 between the defects in the longitudinal direction of the strip. A reduction in the ways of placing can be effected by taking into consideration only the ways for which the two pieces are placed directly against the forward edge of the strip (as represented by the lower horizontal line in each group).

Just as in the case of FIGURE 4, it is possible to provide switches which in the course of manufacture permit a circumvention of one or more groups of elements at will. To avoid confusing the drawing, these switches have not been represented.

In FIGURE 6 there is represented, in a manner similar to that of FIGURE 5, the circuit of logic operations when a table line listing three pieces is selected to have its contents constitute a line, or panel, of the strip, this time the pieces being identical in height YF. The leading edge of the strip is represented by the lower horizontal line of each group. The groups of elements are also represented here according to the manner in which they seek to place the pieces. This circuit of logic operations is suitable, for example, for the element 207 or 307 of FIGURES 2 or 3.

The number of possible manners of placing is greatly limited in the example according to FIGURE 6 as a result of the imposition of a restriction according to which the pieces must be capable of being cut from the forward end of the strip by a maximum number of three longitudinal cutting lines, this being, for example, because only three tools are available for the simultaneous tracing of the longitudinal lines. It is apparent that any other number of lines can be envisaged.

Each of the ways of placing as represented in 601 to 604 necessitates only three cutting lines in the direction of the length of the strip. At 601 and 602, the pieces are placed in a grouped manner adjacent the left edge and the right edge, respectively, of the strip. In 603 and 604, two pieces are grouped along the left edge and the right edge, respectively, of the strip, while the third piece is placed along the opposite respective edge.

As is the case for FIGURE 5, as soon as a cut is possible the group of elements which detects this possibility immediately sends out a positive response.

For FIGURES 4 to 6 it should be remarked that when a group of elements which detects a possible manner of placing sends out a response, the possible manner of placing is simultaneously put into the memory store so that it can be utilized in the eventual cutting.

The allotment of a cost-representing numerical value to each of the order-book pieces to be cut is based on experimental data. To deal completely with any particular order book which includes large, medium and small format pieces, the area of glass required either in sheet or strip or ribbon form to implement the order book can be either estimated before cutting or determined after the cutting of pieces for filling the complete order book. A geometric cutting efficiency, which is the ratio between the total area of the cut pieces and the area of the sheet or strip from which they were cut, can therefore be determined. On the assumption that the cost price of an uncut square meter of glass has a valve of unity, the cost price of a square meter of cut glass can be determined from the geometric efficiency.

However, this is not enough to determine the cost price of each cut piece because such determination also requires a knowledge of the effect of each of the formats on the cost price of a square meter of cut glass. To this end, a new order book is prepared by adding, in the order book for which the geometric efficiency has already been determined, a unit area first, for instance, to the large format pieces. A new geometric cutting efficiency can then be determined for this modified order book. The difference between the latter efficiency and the efficiency of the unmodified order book is a value representing the influence per unit of the area of the large formats of the order book on cost price, and therefore reflects the marginal cost price of the large formats. The resulting marginal cost price of the large formats is obtained by subtracting from the cost price of the cut glass the value obtained by multiplying the said difference by the ratio between the area represented by all the pieces of the order book and the square of the geometric cutting efficiency of the unmodified order book.

The same determination can be made for medium and small formats. The various kinds of formats can be divided more finely than that just set forth. An example of the results of such a determination is represented in FIGURES 7 and 8.

FIGURE 7 shows in diagrammatic form the geometric cutting efficiencies for various order-book arrangements, selected percentage efficiencies being shown on the diagram. The abscissa axis OX indicates the percentage of medium format pieces in the order book, the ordinate axis OY represents the percentage of large formats, and the axis OZ represents the percentage of small format pieces in the order book. In the preparation of this diagram, pieces having an area of 3.5 m.$^2$ or more were considered to be of large format, pieces having an area less than 1 m.$^2$ were considered to be of small format, and pieces having an area of from 1 to 3.5 m.$^2$ were considered to be of medium format. Other percentage cutting efficiencies could be derived by interpolation between the various points for which percentages are shown on the diagram. These cutting efficiency percentages are not to be confused with the format proportion percentages shown along the coordinate axes of the diagram.

To determine the proportion of each format for a given order book which is represented by a given point on the diagram, it is only necessary to construct a line from the point perpendicular to each coordinate axis and the intersection of each line with its associated axis represents the percentage of pieces of that format in the order book. Thus, point 1 in FIGURE 7 represents an order book having 20% medium format pieces, 75% large format pieces, and 5% small format pieces.

Curves 1, 2, 3 and 4 in FIGURE 8 show the variation of the ratio R between the marginal cost price and the area of a piece as a function of the area S of pieces having different formats, prepared from the efficiencies shown in FIGURE 7 and in the manner hereinbefore described, for four order books whose contents are represented by points 1, 2, 3 and 4, respectively, in FIGURE 7. These curves show that the marginal cost prices of pieces of identical format depend upon the distribution of the total order book contents. For any given order book, the numerical value to be allotted to each pieces of the order book is equal to the marginal cost price of such piece.

By preparing a family of curves, like the curves shown in FIGURE 8, for a large number of possible order-book arrangements, the values allotted to the order-book pieces can be modified periodically in dependence upon the evolution of the order-book composition with time, so that the establishment of the economic efficiency of the cutting operations comes very close to reality. For instance, in the case in which an order-book covering a period of three or four months is available, order-book composition is checked every fortnight and, if order-book composition has altered appreciably, the values allotted to the pieces are modified accordingly.

The curves shown in FIGURE 8 were prepared for a particular glass quality—in the present case, very good quality window glass suitable for making mirrors. Similar curves can be prepared for other glass qualities, e.g., plate glass, ordinary window glass and so on. The corresponding curves will differ from the curves of FIGURE 8 since the quality to be achieved alters the geometric efficiency of the cutting as well as the marginal cost price of the various formats. If for instance, quality is higher, cutting requires a bigger area of glass than was required for the first-described quality, and the geometric efficiency decreases. Also, large formats affect the marginal cost prices more than do the same formats of the first-described quality.

This is so because, in a production process in which flaw density and the distribution of the flaws among different kinds are assumed to remain constant, fewer flaws are allowable in the higher-quality pieces than in the lower-quality pieces. In FIGURE 9, curve 1 is identical to the curve 1 of FIGURE 8. Curve 1' corresponds to an order book having the same makeup but intended for a higher-quality glass.

Variations in the density of the flaws present in the sheets, ribbon or strip have a similar effect, modifying the geometric efficiency of cutting and affecting the marginal cost prices, since a reduction in such density makes it easier to cut an order book which has been modified by the addition of a unit surface area to the large formats thereof.

A flaw-free glass sheet or strip is assumed to be represented by the curve 1 in FIGURE 9. Curve 2' of FIGURE 9 was prepared for the same quality of glass with the same order book composition as for curve 1 but with a density of 0.1 flaw per m.$^2$, each particular flaw concerned being point-like, i.e., having an area of 1 cm.$^2$ or less.

When sufficient data is not available to establish the marginal cost price of the pieces, a good approximation of this price can be obtained by the formula $(n(S^{1+\epsilon})+A)$, where $n$ is the cost price for a unit area of material, and $S$ is the area of a given piece.

The unit cost price is a datum which is generally available, since it is based solely upon the conventional elements appearing in the establishment of the cost price, such as the material and energy consumptions, depreciation, etc.

The term $S^{1+\epsilon}$ is also easy to determine. It defines the geometric cutting yield. The area of glass utilized to cut a specific number of pieces having a certain total area can very easily be determined. From these elements the value of $\epsilon$ is deduced and it is attributed to the area of each of the pieces.

The constant A can take account of the various material contingencies which have been defined above. This value is modified as a function of the exploitation circumstances. Thus A is taken as equal to zero when the piece to be obtained is part of a normal order. It assumes values $a, b, c, \ldots$ which increase successively with the degree of urgency or priority. These values $a, b, c, \ldots$ are determined empirically.

It will be understood that the above description of the present invention is subject to various modifications, changes and adaptations.

What is claimed is:

1. A method for the cutting of materials in sheet or strip form into a number of pieces of predetermined dimensions listed in an order book, comprising the steps of:

detecting the defects present in the sheet or strip;

establishing a multi-line table each line of which lists at least one piece taken from at least a part of the order book such that the sum of the dimensions of the pieces listed in each line measured in the direction of the width of the strip or sheet is less than the usable width of the sheet or strip; initially exploring at least part of the table for locating at least one first line, the listed pieces of which can be cut from the forward end of the sheet or strip, taking account of the defects present at such forward end;

providing an indication if any such first line is located;

subsequently exploring, in response to such indication, at least part of the table for locating at least one second line, which could be associated with at least one such first line so that the listed pieces of such second line could be cut, taking account of the defects present, from that part of the sheet or strip which would become the forward end thereof if the pieces listed in one first line which has been located were cut from the existing sheet or strip forward end; and cutting, from the existing forward end, the pieces listed in one such first line which has been located.

2. A method as defined in claim 1 wherein said step of cutting is carried out even when said step of subsequently exploring fails to locate any second line which could be associated with any such first line.

3. A method as defined in claim 2 comprising the further step of cutting, from the forward end of the sheet or strip, a warehouse piece which extends over the whole width of the sheet or strip and the length of which is predetermined, when said step of providing fails to yield such indication.

4. A method as defined in claim 1 wherein each line of the table indicates the ratio between the sum of the numerical values representing the cost prices attributed to the pieces listed in that line and the total area of the strip or sheet required for cutting such pieces, and said step of cutting is carried out with regard to that one of all of the located first lines having the highest such ratio.

5. A method as defined in claim 1 wherein each line of the table contains an indication of the ratio between the sum of the numerical values representing the cost prices of the pieces listed in that line and the total sheet or strip area required for cutting such pieces, and, when said step of subsequently exploring locates at least one second line which can be associated with one such first line, said step of cutting is carried out with regard to that one of all of the located first lines for which an associated second line has been located and for which the sum of its ratio and the ratio of such associated second line is greater than any other combination of a located first line and associated second line.

6. A method as defined in claim 5 wherein said step of establishing a table is carried out by arranging the table lines in order of decreasing values of the ratio contained in each line.

7. A method as defined in claim 6 wherein said steps of exploring are carried out by exploring at least part of the table line by line.

8. A method as defined in claim 7 wherein said step of initially exploring is carried out starting from the first line of the table.

9. A method as defined in claim 8 wherein as soon as said step of initially exploring locates one first line, said step of subsequently exploring is carried out, starting from the first table line, until a second line is located which could be associated with such first line.

10. A method as defined in claim 9 wherein, when said step of subsequently exploring has been carried out for all of the table lines without locating such a second line, said step of initially exploring is recommenced, from the table line immediately following the previously located first line, for locating a new first line.

11. A method as defined in claim 1 wherein said step of establishing a table is carried out to include only pieces listed in a portion of the order book.

12. A method as defined in claim 11 wherein the portion of the order book lists only pieces having certain dimensions and intended for distribution to a limited number of handling units.

13. A method as defined in claim 12 wherein the portion of the order book lists pieces of several different qualities.

14. A method as defined in claim 1 wherein said step of establishing a table is carried out by including in each table line only pieces having substantially the same dimension in the direction of the length of the sheet or strip.

15. A method as defined in claim 1 wherein said step of establishing a table is carried out by including in each table line only pieces having substantially the same dimensions measured in the direction of the sheet or strip.

16. A method as defined in claim 15 wherein the number of pieces listed in any table line is equal to an integer $n$, where the dimension of each listed piece measured in the direction of the width of the sheet or strip is less than the width of the sheet or strip divided by $n$, $n$ being the largest divisor permitted by the width of the sheet or strip to yield bands whose width is still greater than the dimension of the pieces measured in the direction of the width of the sheet or strip.

17. A method as defined in claim 1 wherein said step of initially exploring is carried out by testing, for each explored line of the table, the placement of that one of the pieces listed in such line having the largest dimension measured in the direction of the length of the sheet or strip with its edge along the forward edge of the sheet or strip.

18. A method as defined in claim 17 wherein said step of initially exploring further includes testing the placement of the remaining pieces of such line with their edges also along the forward edge of the sheet or strip.

19. A method as defined in claim 17 wherein said step of initially exploring further includes testing the placement of the remaining pieces of such line in a band extending across the width of the sheet or strip and having a length which is equal to the dimension, measured in the direction of the length of the sheet or strip, of the piece having the largest dimension in that direction.

20. A method as defined in claim 17 wherein, for the combination of pieces of each explored line of the table, such testing is carried out on the forward end of the sheet or strip according to a number of predetermined placement plans.

21. A method as defined in claim 20 wherein such testing includes, for each such placement plan, verifying whether any defects would be located in any of the pieces of the combination.

References Cited

UNITED STATES PATENTS

| | | |
|---|---|---|
| 1,179,119 | 4/1916 | Lyon. |
| 2,055,234 | 9/1936 | Howe _____ 33—6 |
| 3,242,573 | 3/1966 | Noel. |

WILLIAM D. MARTIN, JR., Primary Examiner

U.S. Cl. X.R.

83—39